United States Patent
Fenton

[15] 3,679,689
[45] July 25, 1972

[54] PREPARATION OF SUBSTITUTED PYRIDINES

[72] Inventor: Donald M. Fenton, Anaheim, Calif.

[73] Assignee: Union Oil Company of California, Los Angeles, Calif.

[22] Filed: July 6, 1970

[21] Appl. No.: 52,702

Related U.S. Application Data

[63] Continuation-in-part of Ser. No. 655,750, July 25, 1967, abandoned.

[52] U.S. Cl. .......................260/290 H, 260/242, 260/290 P
[51] Int. Cl. ..........................................................C07d 29/40
[58] Field of Search....................................................260/290

[56] References Cited

UNITED STATES PATENTS 3,532,701  10/1970  Marinak .................................260/290

*Primary Examiner*—Henry R. Jiles
*Assistant Examiner*—Harry I. Moatz
*Attorney*—Milton W. Lee, Richard C. Hartman, Lannas S. Henderson, Robert E. Strauss and Stuart W. Knight

[57] ABSTRACT

Substituted pyridines are prepared by reacting an ethylenically unsaturated hydrocarbon, carbon monoxide, water and ammonia in a liquid medium containing a Group VIII noble metal catalyst in complex association with a biphyllic ligand or an aromatic heterocyclic amine at a temperature of 50° to 400° C and a pressure of 5 to 300 atmospheres. A typical process comprises contacting ethylene, carbon monoxide and water with a liquid reaction medium containing rhodium trichloride and triphenylphosphine to produce dihydrodimethylethylpyridine.

18 Claims, No Drawings

PREPARATION OF SUBSTITUTED PYRIDINES

DESCRIPTION OF THE INVENTION

This application is a continuation-in-part of application Ser. No. 655,750, filed July 25, 1967, now abandoned.

This invention relates to the preparation of hydrocarbon substituted, particularly alkyl substituted, pyridines and dihydropyridines. More particularly, the invention relates to preparation of such pyridines by reaction of an ethylenically unsaturated hydrocarbon with carbon monoxide, water and ammonia in the presence of a complex noble metal catalyst.

The products of the reaction are useful raw materials for the production of various pharmaceuticals such as sulfonamides, antihistamines, etc., and for other useful chemical products such as surfactants and solvents for synthetic resins. They are also useful as solvents and catalysts for certain organic reactions. The products of the process have the general formula:

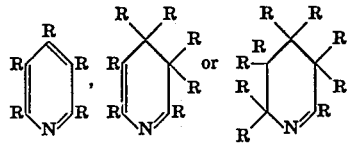

wherein R is hydrogen or a hydrocarbyl group with its identity depending, of course, on the olefinic reactant and being alkyl, cycloalkyl, alkylcycloalkyl, cycloalkylalkyl, aryl alkaryl, or aralkyl. The product contains at least one hydrocarbyl substituent.

Prior art patents such as U.S. Pat. Nos. 2,935,513, 2,963,484 and 2,995,558 disclose preparation of pyridine or substituted pyridines by reaction of aldehydes, alcohols, acetylenic compounds, etc., with ammonia. However, the present invention has the distinct advantage of preparation of the substituted pyridines from basic and economical raw materials.

According to the invention, the substituted pyridines or hydropyridines are prepared by reacting an ethylenically unsaturated hydrocarbon, carbon monoxide, water and ammonia in a liquid reaction medium containing a Group VIII noble metal-containing catalyst in complex association with a biphyllic ligand or an aromatic heterocyclic amine. A hydroxytetrahydropyridine is initially formed which dehydrates to a hydropyridine. The hydropyridine can undergo dehydrogenation to form a pyridine.

The ethylenically unsaturated hydrocarbon reactant has two to about 24 carbons, preferably two to about 18 carbons and has the following formula:

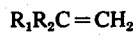

wherein $R_1$ and $R_2$ are hydrogen or the same or different alkyl, cycloalkyl or aryl, preferably alkyl.

As used herein, the terms alkyl, cycloalkyl and aryl include hydrocarbyl groups wherein the radical carbon of the group is in an alkyl, cycloalkyl or aryl groups and thus includes groups such as aralkyl, alkaryl, alkylcycloalkyl, etc., as well as purely alkyl, cycloalkyl and aryl groups. Examples of alkyl groups therefore include ethyl, benzyl and phenylhexyl; examples of cycloalkyl include cyclohexyl and methylcyclopentyl; and examples of aryl include phenyl and p-dodecylphenyl. The particular hydrocarbyl group is not the essence of the invention since the functional carbons are the carbons forming the olefinic double bond.

Examples of useful unsaturated hydrocarbons are propylene, butene-1, pentene-1, 2-methylbutene-1, hexane-1, 3-ethylhexene-1, octene-1, 2-propylhexene-1, decene-1, 4,4'-dimethylnonene-1, dodecene-1, 6-propyldecene-1, tetradecene-1, 7-amyldecene-1, hexadecene-1, 4-ethyltridecene-1, octadecene-1, 5,5-dipropyldodecene-1, eicosene-1, 3-cyclobutyloctene-1, styrene, p-methylstyrene, diphenylethylene, 6-phenylhexene-1, 3,4-diphenylbutene-1, 3-benzylheptene-1, 18 6-phenyl-octene-1, 3,6-diphenyloctene-1, 5-butyl-7-cyclohexylnonene-1, 3-tolyl-4-ethyldodecene-1, etc. Of these the aliphatic hydrocarbon alpha olefins having from about two to 18 carbons, e.g., ethylene, butene-1, dodecene-1, etc., are preferred.

The catalyst employed of the invention is a Group VIII noble metal which is preferably in complex association with a biphyllic ligand of phosphorus, arsenic or antimony or with an aromatic heterocyclic amine.

The Group VIII noble metal can be palladium, rhodium, ruthenium, platinum, osmium or iridium. While catalysts containing any of these metals are active for the reaction, I prefer to employ rhodium-containing catalysts because of their demonstrated greater activity, particularly at the relatively mild reaction conditions employed for the reaction. A catalytic quantity of the Group VIII noble metal-containing catalyst is used. This is generally an amount sufficient to provide a concentration of the Group VIII noble metal which is between about 0.001 and about 5.0 weight percent of the liquid reaction medium and preferably between about 0.001 and about 0.5 weight percent. The Group VIII noble metal can be added to the reaction medium as a soluble salt, an acid, hydroxide, a complex, particularly an ammino, halo, hydride, or carbonyl complex, or as the elemental metal. The particular form in which the metal is added is not critical since in all cases, it forms a complex with the biphyllic ligand or the aromatic heterocyclic amine.

Examples of suitable salts are the nitrates, halides, hydroxides, cyanides, sulfates, sulfites, carbonates, $C_1$–$C_{20}$ carboxylates, etc., of the metals such as rhodium nitrate, platinum nitrate, palladium chloride, rhodium fluoride, palladium hydroxide, platinum cyanide, osmium sulfate, rhodium sulfite, rhodium carbonate, palladium carbonate, platinum propionate, rhodium acetate, etc. Examples of suitable complexed sources are rhodium carbonyl, ruthenium pentacarbonyl, diamminepalladium hydroxide, tetramminepalladium tetrachloropalladate, tetrachlorodiammine platinum, aquopentammine iridium chloride, nitratopentammine iridium nitrate, palladium acetyl acetonate, hexachloroplatinic acid, tetracyanoplatinic acid, potassium hexachloroplatinate, ammonium tetracyanoplatinate, etc. The carbonyl of the Group VIII noble metal can be prepared externally and introduced into the reaction medium or the carbonyl compound can be produced in situ by the addition of the Group VIII noble metal and introduction of the carbon monoxide during the reaction to form an active carbonyl complex.

The biphyllic ligand which is in complex association with the Group VIII noble metal is a compound having an element with a pair of electrons capable of forming a coordinate bond with a metal atom and simultaneously having the ability to accept the electron from the metal, thereby imparting additional stability to the resulting complex. Biphyllic ligands can comprise organic compounds having at least about three carbons and containing arsenic, antimony or phosphorus in a trivalent state. Of these, the phosphorus compounds, i.e., the phosphines, are preferred; however, the arsines and stibines can also be employed. The biphyllic ligands are well known in the art and in general have the following structure:

wherein E is a trivalent atom selected from the class consisting of phosphorus, arsenic and antimony; and
wherein R is a member of the class consisting of alkyl having one to 10 carbons, cycloalkyl having four to 10 carbons, aryl having six to 10 carbons, and halo, amino and alkoxy substitution products thereof.

Examples of suitable biphyllic ligands having the aforementioned structure and useful in my invention to stabilize the catalyst composition are the following; trimethylphosphine, triethylarsine, triisopropylstibine, triaminobutylarsine, ethyldiisopropylstibine, tricyclohexylphosphine, triphenylphosphine, tri(o-tolyl)phosphine, phenyldiisopropylphosphine, phenyldiamylphosphine, diphenylethylphosphine, tritolylbismuthine, ethyldiphenylphosphine, phenylditolylphosphine, cyclopentyldixylylstibine, dioctylphenylphosphine, etc. Of the aforementioned, the aryl phosphines, particularly the triarylphosphines, e.g., triphenylphosphine, are preferred because of their demonstrated greater activity for stabilization of catalysts.

The catalyst may be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300 percent of that stoichiometrically required to form a complex with the metal and is generally 0.002–10 weight percent, preferably 0.002–2 percent of the reaction medium. The complex has from 1 to about 5 moles of biphyllic ligand per atom of the metal and other components such as hydride, or soluble anions such as sulfate, nitrate, carboxylates (e.g., acetate, propionate, isobutyrate, valerate, etc.), halide, etc. may be but need not be included in the complex catalyst of this invention. These components may be incorporated in the catalyst by the formation of the catalyst complex from a metal salt of the indicated anions. A preferred complex is one comprising at least one halide or carboxylate, ligand, e.g., chloride, bromide, iodide, fluoride, acetate, propionate, butyrate, benzoate, etc., since these groups, particularly the halides, improve the activity of the catalyst.

The Group VIII noble metal may also be complexed with a tertiary aromatic heterocyclic amine having five to 20 carbons and one to three aromatic rings, preferably a tertiary hydrocarbon aromatic heterocyclic amine having five to 12 carbons and one aromatic ring. The amine may contain one to four electron-withdrawing groups such as halogen, e.g., chloride, bromide, fluoride and iodide; nitro; sulfo; cyano; etc., which may enhance the activity of the amine complex. Examples of such compounds are pyridine, pyrazine, pyrimidine, quinoline, isoquinoline, acridine, 2-chloropyridine, 3-methylpyridine, 4 -cyanopyridine, 3-nitropyridine, ethylpyridine, butylpyridine, 7-ethylisoquinoline, 3-methylquinoline, etc. Of the aforementioned amine, pyridine and its $C_1$–$C_4$ alkyl and chloro derivatives are preferred. The amines are used in catalytic amounts, e.g., 0.001 to 10 weight percent of the reaction medium.

The reaction is performed under liquid phase conditions and may be performed in the presence of any conventional solvent which is inert to the reactants, the catalyst, the products and the reaction conditions. Examples of suitable organic solvents that can be used in accordance with my invention include hydrocarbons such as the aromatics, aliphatics or alicyclic saturated hydrocarbons, ethers, and alcohols, etc.

Examples of suitable solvents include benzene, toluene, xylene, ethylbenzene, tetralin, etc.; pentane, isopentane, hexane, isohexane, heptane, octane, isooctane, naphtha, gasoline, kerosene, mineral oil, etc.; cyclopentane, cyclohexane, methylcyclopentane, decalin, indane, diisopropylether, di-n-butyl ether, ethylene glycol diisobutyl ether, methyl oc-tolyl ether, ethylene glycol dibutyl ether, diisoamyl ether, methyl p-tolyl ether, methyl m-tolyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, ethanol, propanol, butanol, t-butyl alcohol, t-octyl alcohol, sec-pentyl alcohol, benzyl alcohol, etc.

The process may be conducted in the absence of solvent by providing an excess, e.g., 30–100 percent in excess of that stoichiometrically required, of the water reactant, the olefinic reactant if such is a liquid, or such an excess of the ammonia reactant if supplied as liquid ammonia or ammonium hydroxide. A preferred reaction medium is concentrated ammonium hydroxide.

The reaction is performed under relatively mild conditions including temperatures from about 50° C. to about 400° C.; preferably from about 70° C. to about 200° C. Sufficient pressure is used to maintain the reaction medium in liquid phase. Although atmospheric pressure can be used, the rate of reaction is dehydrogenated by super-atmospheric pressures and, therefore, pressures from about 5 to about 300 atmospheres absolute and preferably from about 10 to about 100 atmospheres are used. The reaction is exothermic and the temperature can be maintained by suitable cooling of all or a portion of the reaction zone contents. The pressures can be maintained by the pressure of the gases supplied to the reaction zone. If desired, a suitable inert gas, such as nitrogen, can also be charged to the reaction zone to reduce the partial pressures of the reacted gases, i.e., hydrogen and carbon monoxide. The dihydropyridine can be dhydrogenated under known prior art conditions, either in the same or different reaction vessel to form the corresponding pyridine. Preferably the dehydrogenation is accomplished in the same reaction vessel, preferably by simply raising the temperature 25°–150° C.

Proportions of the reactants are not critical, although certain proportions may be optinum for a given ethylenically unsaturated compound, catalyst and solvent. Selection of optimum proportions will be obvious to one skilled in the art. In general, the amount of CO (based on the moles of ethylenically unsaturated hydrocarbon) is preferably from about 0.1 to 30 mole percent, and the amount of $NH_3$ (supplied as a gas, as a liquid or as ammonium hydroxide) from about 0.1 to 95 mole percent.

The reaction is preferably conducted in the presence of an inorganic base. The ammonia reactant is sufficiently alkaline and is a preferred base. Other bases such as ammonium hydroxide or $C_1$ to $C_5$ alkanoates, e.g., ammonium acetate, or the alkali metal and alkaline earth metal hydroxides or $C_1$ to $C_5$ alkanoates such as potassium hydroxide, calcium hydroxide, strontium hydroxide, sodium acetate, lithium propionate, magnesium butyrate, potassium valerate, magnesium acetate, etc., are advantageously used. The amount of such base can be from about 0.01 to 10 weight percent of the reaction medium. The base may be provided in aqueous solution so as to provide a source of the water reactant.

The invention will be more specifically illustrated by the following non-limiting examples:

EXAMPLE 1

To a 1-gallon steel autoclave were added 800 milliliters of concentrated ammonium hydroxide, 0.5 grams of rhodium trichloride, 5 grams of triphenylphosphine and 10 grams of sodium hydroxide. The autoclave was pressured with ethylene to 275 atmospheres and with carbon monoxide to 55 atmospheres. The mixture was stirred and heated to and maintained at 150° C. for 2 hours. There was obtained a 34 gram weight increase of the liquid contents, from which was isolated 4 grams of dihydrodimethylethylpyridine, b.p. 30° –35° C/1 mm, $N_D^{24}$ 1.4902.

EXAMPLE 2

The above reaction was repeated except that this experiment was conducted at 200° C. for 2hours. There resulted a 110 gram weight increase with a similar product distribution.

EXAMPLE 3

The above reaction was repeated except that 30 grams of ammonium acetate was substituted for the sodium hydroxide. There resulted a 109 gram weight increase, from which was isolated 26 grams of dihydrodimethylpyridine b.p. 30° –40° C/1 mm, $N_D^{24}$ 1.4748. 1.4748.

EXAMPLE 4 1.4789,

To the autoclave were added 800 milliliters concentrated ammonium hydroxide, 0.1 grams of chlorocarbonylbistriphenylphosphine rhodium (I), 3 grams triphenylphosphine and 10 grams of sodium hydroxide. The autoclave was pressured with ethylene to 27.5 atmospheres and with carbon monoxide to 55 atmospheres. The mixture was stirred and heated to and maintained at 200° C. for 2 hours. A 62 gram weight increase resulted. In addition to the dihydrodimethylethylpyridine there was isolated dihydrodimethylisopentylpyridine, $N_D^{24}$ 1.4789, b.p. 90°–100° C/1 mm.

EXAMPLE 5

To the autoclave were added 800 milliliters concentrated ammonium hydroxide, 0.2 grams rhodium trichloride and 3 grams of triphenylphosphine. The autoclave was pressured with ethylene to 27.5 atmospheres and with carbon monoxide to 55 atmospheres. There resulted an 82 gram weight increase. A mixture of dihydrodimethylpyridine, b.p. 200° C. $N_D^{26}$ 1.4732, was isolated.

EXAMPLE 6

The above reaction was repeated except that the pressure of ethylene was 21.5 atmospheres and that of carbon monoxide was 35 atmospheres. There was a 92 gram weight increase. In addition to the usual dihydropyridines there was isolated a solid, m.p. 84° C., b.p. 110°–130° C/1 mm which analyses for $C_9H_{18}N$?

EXAMPLE 7

To the autoclave were added 800 milliliters concentrated ammonium hydroxide, 40 grams ammonium sulfate, one-third gram rhodium trichloride and 3 grams triphenylphosphine. The autoclave was pressured with ethylene to 55 atmospheres and with carbon monoxide to 58 atmospheres. The mixture was stirred and heated to and maintained at 200° C. for 2 hours. The final pressure was 36.5 atmospheres and the weight gain was 144 grams. The upper layer weighed 85 grams and was 18 percent dimethylethylpyridine.

EXAMPLE 8

To the autoclave were added 800 milliliters concentrated ammonium hydroxide, one-third gram rhodium trichloride and 10 grams sodium hydroxide. The autoclave was pressured with ethylene to 27.5 atmospheres and with carbon monoxide to 55 atmospheres. The mixture was stirred and heated to and maintained at 100° C. for 1 hour, then 200° C. for 1 hour. Final pressure was 43 atmospheres but no pyridines were found.

EXAMPLE 9

To the autoclave were added 400 milliliters ammonium hydroxide, 400 milliliters pyridine, 4 milliliters 2-chloropyridine, 10 grams sodium hydroxide and one-third gram rhodium trichloride. The autoclave was pressured with ethylene to 27.5 atmospheres and with carbon monoxide to 55 atmospheres. The mixture was stirred and heated to and maintained at 100° C. for 6 hours. Final pressure was 51 atmospheres and the weight gain was 35 grams. There was found 11.5 grams of dimethylethylpyridines.

EXAMPLE 10

To the autoclave were added 800 milliliters of ammonium hydroxide, one-half gram rhodium trichloride and 3 milliliters of 2-chloropyridine. The autoclave was pressured with ethylene to 21.3 atmospheres and with carbon monoxide to 55 atmospheres. The mixture was stirred and heated to and maintained at 200° C. for 2 hours. The weight gain was 77 grams and the upper layer weighed 26 grams. Of the 26 grams, 44 percent was dimethylethylpyridines.

EXAMPLE 11

To an autoclave is added 800 milliliters concentrated ammonium hydroxide, one-third gram iridium sulfate, 5 grams cyclopentyldixylylstibine and 100 grams 3-phenyldodecene-1. The autoclave is stirred and heated to and maintained at 300° C for 10 hours. The autoclave is cooled and depressured and the liquid contents removed and the bis-γ-phenylnonyl-δ-phenyldecyldihydropyridine recovered by distillation.

EXAMPLE 12

To an autoclave is added 500 milliliters concentrated ammonium hydroxide, 300 milliliters butene-1, 5 grams palladium acetyl acetonate and 10 grams triaminobutylarsine. The autoclave is pressured with carbon monoxide to 60 atmospheres. The mixture is heated to and maintained at 400° C for 15 hours. The autoclave is cooled and depressured and the liquid contents removed and dipropylbutyl dihydropyridine recovered by distillation.

EXAMPLE 13

To an autoclave is added 500 milliliters ammonium hydroxide, 300 grams 2-butyl-3-cyclohexylnonene-1, 1 gram palladium chloride and 5 grams methyldiphenylphosphine. The autoclave is pressured with carbon monoxide to 45 atmospheres. The mixture is heated to and maintained at 250° C for 5 hours. The autoclave is cooled and depressured and the liquid contents removed and bis($\alpha$-butyl-B-cyclohexyloctyl)-B-butyl-γ-cyclohexylnonyl dihydropyridine recovered by distillation.

EXAMPLE 14

To an autoclave is added 800 milliliters concentrated ammonium hydroxide, 10 grams rhodium trichloride, and 30 grams pyridine. The autoclave is pressured with ethylene to 30 atmospheres and carbon monoxide to 60 atmospheres. The autoclave is heated to and maintained at 200° C for 10 hours. The liquid contents are removed and dihydrodimethylethylpyridine recovered by distillation.

EXAMPLE 15

To an autoclave is added 500 milliliters ammonium hydroxide, 10 grams iridium trichloride and 15 grams 3-methyl quinoline. The autoclave is pressured with ethylene to 30 atmospheres and carbon monoxide to 50 atmospheres. The autoclave is heated to and maintained at 200° C for 4 hours. The liquid contents are removed and dihydrodimethylethylpyridine recovered by distillation.

EXAMPLE 16

To an autoclave is added 500 milliliters ammonium hydroxide, 10 grams rhodium trichloride and 15 grams acridine. The autoclave is pressured with ethylene to 20 atmospheres and carbon monoxide to 40 atmospheres. The mixture is heated to and maintained at 200° C for 4 hours. The liquid contents are removed and dihydrodimethylethylpyridine recovered by distillation.

The preceding examples are intended solely to illustrate practice of the invention and are not intended to be unduly limiting thereof. Instead, it is intended that the invention be defined by the reactants and conditions, and obvious equivalents thereof, which are set forth in the following claims.

I claim:

1. A process for the production of an $R_1$ and $R_2$ hydrocarbyl-substituted dihydropyridine comprising reacting at a temperature of 50° to 400° C. and a pressure of 5 to 300 atmospheres sufficient to maintain liquid phase an ethylenically unsaturated hydrocarbon having two to 24 carbons and having the structure:

$$R_1R_2C\!\!=\!\!CH_2$$

wherein $R_1$ and $R_2$ are hydrogen or the same or different alkyl, arylalkyl, cycloalkyl alkylcycloalkyl, aryl, or alkylaryl; carbon monoxide; ammonia and water in a liquid reaction medium comprising an inert solvent or from 30 to 100 percent excess of said water, olefin, ammonia or ammonium hydroxide and containing from 0.001 to 10 weight percent of a tertiary aromatic heterocyclic amine having nitrogen as the heterocyclic atom and having five to 20 carbons and one to three aromatic rings at least one of which is heterocyclic or with 0.002 to 10 weight percent of a biphyllic ligand having the structure:

$$E(R)_3$$

wherein E is trivalent phosphorus, arsenic or antimony; and R is alkyl having one to 10 carbons, cycloalkyl having four to 10 carbons, or phenyl or a methyl, halo, amino, or alkoxy substitution product thereof having six to 10 carbons.

2. The process of claim 1 in which the Group VIII noble metal is rhodium.

3. The process of claim 1 in which the ethylenically unsaturated hydrocarbon is a alpha alkene having two to 18 carbons.

4. The process of claim 3 in which the olefin is ethylene.

5. The process of claim 1 in which the noble metal is supplied to the reaction medium as a salt soluble in said reaction medium to form said complex in situ.

6. The process of claim 1 in which the process is conducted in the presence of a catalytic amount of triphenylphosphine.

7. The process of claim 1 wherein said noble metal is rhodium and the process is conducted in the presence of 0.002–10 weight percent of a triarylphosphine.

8. The process of claim 7 wherein said ethylenically unsaturated hydrocarbon is an alpha alkene having two to 10 carbons and wherein the rhodium is supplied to the reaction medium as a salt soluble in the reaction medium to form said complex in situ.

9. The process of claim 8 wherein said olefin is ethylene.

10. The process of claim 1 wherein the process is conducted in the presence of 0.001–10 weight percent of pyridine or 2-chloropyridine.

11. The process of claim 8 conducted at a temperature of 70°–200b$L$ C.

12. The process of claim 9 conducted at a temperature of 70°–200b$L$ C.

13. The process of claim 10 wherein said triarylphosphine is triphenylphosphine and said rhodium salt is added as rhodium trichloride to form said complex in situ.

14. The process of claim 11 wherein said triarylphosphine is triphenylphosphine and said rhodium salt is added as rhodium trichloride to form said complex in situ.

15. The process of claim 1 wherein the reaction medium contains 0.01–10 weight percent of an inorganic base selected from the group consisting of ammonium hydroxide, an ammonium $C_1$–$C_3$ alkanoate an alkali metal hydroxide, an alkali metal or $C_1$–$C_5$ alkanoate, an alkaline earth metal hydroxide and an alkaline earth metal $C_1$–$C_5$ alkanoate.

16. The process of claim 15 wherein said ethylenically unsaturated hydrocarbon is ethylene, said Group VIII noble metal is rhodium, said biphyllic ligand is triphenylphosphine, and said tertiary aromatic heterocyclic amine is pyridine or 2-chloropyridine.

17. The method of claim 8 wherein the ammonia and water reactants are supplied to the reaction medium as concentrated ammonium hydroxide.

18. The method of claim 17 wherein said monoolefin is ethylene.

* * * * *

UNITED STATES PATENT OFFICE
CERTIFICATE OF CORRECTION

Patent No. 3,679,689    Dated July 25, 1972

Inventor(s)  Donald M. Fenton

It is certified that error appears in the above-identified patent and that said Letters Patent are hereby corrected as shown below:

Column 7, line 29, "10" should be -- 18 --.

Column 8, lines 6 and 8, "200bLC." should be -- 200°C.--.

Signed and sealed this 26th day of December 1972.

(SEAL)
ATTEST:

EDWARD M. FLETCHER, JR.
Attesting Officer

ROBERT GOTTSCHALK
Commissioner of Patents